United States Patent
Witt et al.

[11] Patent Number: 5,322,017
[45] Date of Patent: Jun. 21, 1994

[54] ACTIVE PROXIMITY FUSE

[75] Inventors: Bengt Witt, Karlskoga; Björn Thorsson, Göteborg, both of Sweden

[73] Assignee: Bofors AB, Karlskoga, Sweden

[21] Appl. No.: 983,717

[22] Filed: Dec. 1, 1992

[30] Foreign Application Priority Data

Dec. 4, 1991 [SE] Sweden ................. 9103602

[51] Int. Cl.$^5$ .......................................... F42C 13/02
[52] U.S. Cl. ............................................. 102/213
[58] Field of Search ............. 102/213, 214; 356/1, 356/4, 5

[56] References Cited

U.S. PATENT DOCUMENTS

| 4,733,609 | 3/1988 | Goodwin et al. ............ 102/213 |
| 4,752,799 | 6/1988 | Stauffer ........................ 356/1 |
| 4,896,031 | 1/1990 | Pettersson et al. .......... 356/1 |

FOREIGN PATENT DOCUMENTS 3114279 10/1982 Fed. Rep. of Germany .
458480 4/1989 Sweden .

Primary Examiner—Daniel T. Pihulic

[57] ABSTRACT

The invention relates to an active proximity fuse with polarization-related sensitivity. Radiation which is reflected by particles in the atmosphere towards the receiver of the proximity fuse and which does not originate from reflection at the target has a negative effect on the operation of a proximity fuse. To reduce this effect the proximity fuse according to the invention is provided with elements in the transmitter of the proximity fuse for linearly polarizing the emitted radiation and elements in the receiver from suppressing the received radiation with linear polarization essentially coinciding with the direction of the linear polarization of the emitted radiation. This prevents radiation which is reflected by spherical particles, such as water droplets, with unchanged polarization after reflection, from reaching the detector of the receiver, while radiation reflected by the target is depolarized and a certain part of the radiation can be detected.

9 Claims, 1 Drawing Sheet

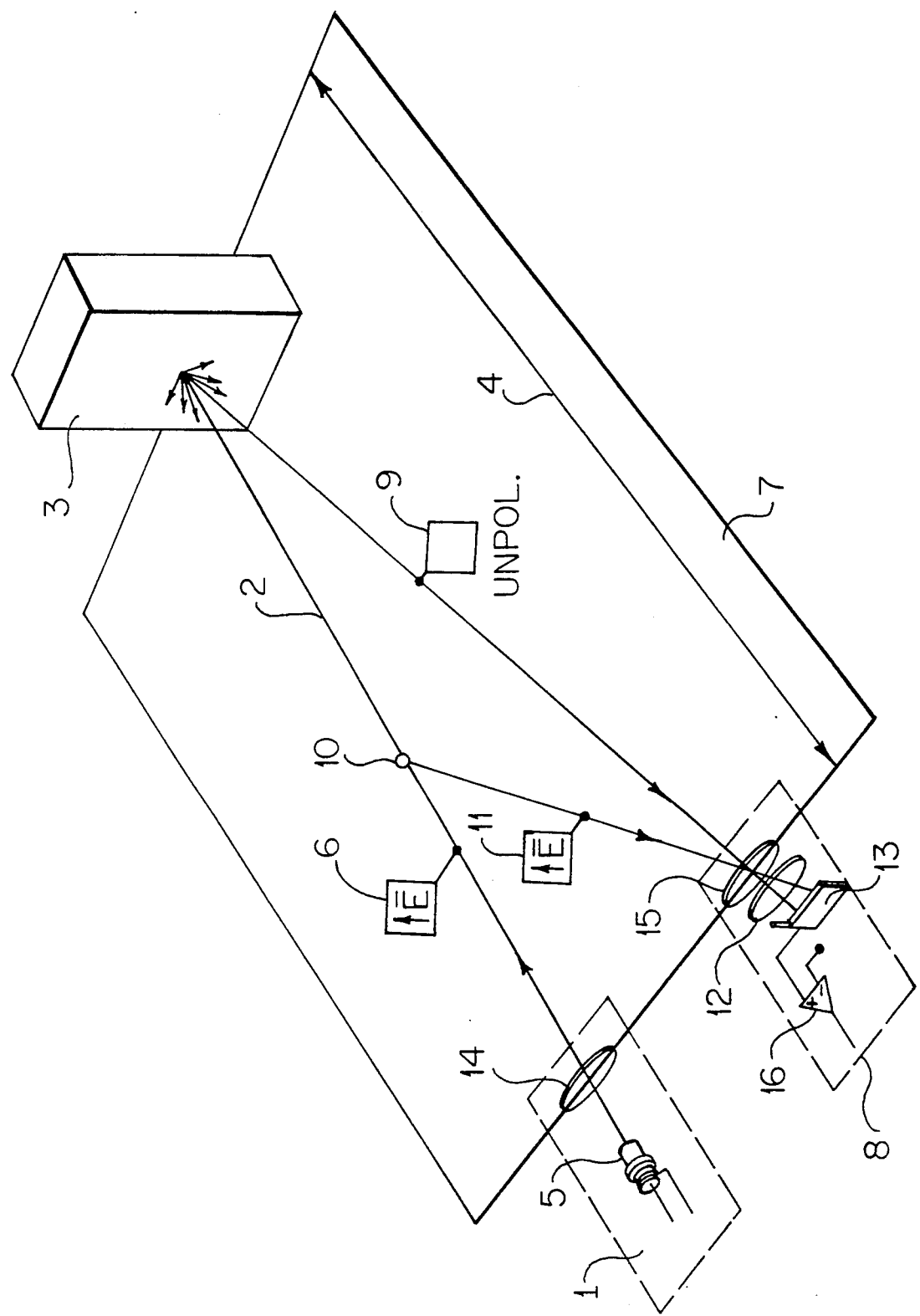

ACTIVE PROXIMITY FUSE

FIELD OF THE INVENTION

The present invention relates to an active proximity fuse for a launchable unit such as a missile, rocket, projectile, and so forth.

BACKGROUND OF THE INVENTION

The proximity fuse comprises a transmitter for transmitting electromagnetic radiation towards a target and a receiver for receiving the transmitted electromagnetic radiation which is reflected towards the receiver. By electromagnetic radiation it is meant preferably but not exclusively optical light. A reference plane is defined as the plane in which electromagnetic radiation emitted from the transmitter towards the target is transmitted between the transmitter and the receiver.

When the radiation lobe of the transmitter covers a target or parts of a target, the target or an area of the target is imaged as a spot on a detector in the receiver. An electrical signal is received at the detector output which varies as a function of the distance to the target and the capability of the target surface to reflect the electromagnetic radiation emitted by the transmitter. The electrical signal can be compared with a fixed reference level and when this is exceeded, the proximity fuse thereby delivers an output signal which can be utilized by the launchable unit for a weapon charge, as an example.

Active proximity fuses of the type specified above are already known, and in this connection reference can be made, for example, to SE B 458 480.

The operation of the proximity fuse can be disturbed by spherical particles which occur in the atmosphere. Examples of such particles are water drops in haze, fog and clouds. These particles reflect some of the electromagnetic radiation emitted by the transmitter of the proximity fuse towards the receiver of the proximity fuse. This makes it more difficult to distinguish the radiation reflected by the target and the accuracy of detection is impaired.

SUMMARY OF THE INVENTION

It is the object of the present invention to produce a proximity fuse which is less sensitive to disturbances caused by radiation which reaches the receiver via reflections from spherical particles in the atmosphere.

The object of the invention is achieved by an active proximity fuse which is characterised by the fact that the transmitter comprises elements for linearly polarizing the emitted electromagnetic radiation in parallel with or orthogonally to the reference plane, and the receiver comprises elements for suppressing received electromagnetic radiation with linear polarization essentially coinciding with the linear direction of polarization of the emitted electromagnetic radiation, that is either parallel with or orthogonal to the reference plane, a detector for detecting electromagnetic radiation remaining after suppression and signal-comparing elements for comparison of the remaining electromagnetic radiation level with a reference level.

The present invention prevents radiation reflected from spherical particles from reaching the detector of the receiver. This follows from the natural laws. The direction of the electrical field vector of the radiation of linearly polarized radiation which is reflected from a homogeneous spherical particle remains unchanged relative to a reference plane which contains both incoming and outgoing ray, with a prerequisite that the direction of polarization of the outgoing ray is orthogonal to or parallel with the reference plane. Linearly polarized radiation which reaches the target will, on the other hand be wholly or partially depolarized with the diffuse reflection from the target surface. The ratio between the useful signal, that is the radiation reflected by the target, and the useless signal, that is radiation reflected from spherical particles in the atmosphere, can thereby be improved. The proximity fuse can therefore operate with high accuracy regardless of the radiation which hits the receiver as a consequence of reflections of the emitted radiation from spherical particles in the atmosphere. A satisfactory operation of the proximity fuse is also obtained in difficult types of weather, since the received electromagnetic radiation with linear polarization coinciding with the linear polarization direction of the emitted radiation can be wholly or partially suppressed.

According to a preferred embodiment, a laser diode with linear polarization is arranged for producing the electromagnetic radiation emitted by the transmitter. Alternatively, may advantageously a linear polarized HeNe laser be used.

According to a further embodiment, the element in the receiver for suppressing the electromagnetic radiation essentially coinciding with the linear direction of polarization of the emitted electromagnetic radiation consists of a polarization filter. The polarization filter can advantageously consist of a dichroic polarizer or a GLAN prism.

A proposed embodiment which has the characteristics significant of the present invention is described below with reference to the attached drawing.

BRIEF DESCRIPTION OF THE DRAWING

The figure shows an active proximity fuse with polarization-related sensitivity.

DETAILED DESCRIPTION OF THE PREFERRED EMBODIMENT

The proximity fuse according to the present invention, shown in basic diagrammatic form, comprises a transmitter (1) and a receiver (8). Transmitter (1) and receiver (8) of the proximity fuse are placed at a distance from one another and aligned in such a manner that the photons sent out from the transmitter, and which later reach the receiver after exactly one reflection, have travelled in an unambiguously defined plane, called hereinafter reference plane (7).

The transmitter (1) irradiates a target (3), which is present within the operating field (4) of the proximity fuse, with a narrow transmitting lobe (2). The electromagnetic radiation in the transmitting lobe is produced with the aid of a laser diode (5) with inbuilt linear polarization. Alternatively, a linear polarized HeNe laser can be used with a wavelength of 540 nm. In the embodiment shown, the laser diode (5) is oriented relative to the reference plane (7) in such a manner that the emitted radiation (6) is linearly polarized with the electrical field vector orthogonal to the reference plane (7). Alternatively, the emitted radiation can be linearly polarized with the electrical field vector parallel with the reference plane. A lens arrangement is arranged in the transmitter for finally shaping the transmitting lobe (2) for the radiation emitted by the laser diode (5).

The receiver contains a lens arrangement (15) which focuses the radiation received at the receiver input on a detector (13). Between the lens arrangement (15) and the detector (13), the receiver is provided with a polarization filter (12). The filter can consist of a polarizer or a prism. A comparator (16) is arranged to compare the output signal from the detector (13) with a fixed reference level. An output signal is emitted when the detector output signal exceeds the fixed reference level.

Radiation which is sent out by the transmitter (1) is reflected back to the receiver of the proximity fuse partially as useful radiation (9) after having been reflected from the target and partially as useless radiation (11) after having been reflected from atmospheric particles (10), for example spherical water droplets. The radiation which has been reflected from the target is wholly or partially depolarized, while the radiation which has been reflected from spherical particles is polarized in exactly the same way as the emitted radiation.

The polarization filter 12 is oriented in such a manner that radiation with the electrical field vector in the reference plane 7 is transmitted. Radiation with an electrical field vector orthogonal to the reference plane is stopped wholly or partially.

The polarization filter (12) thereby prevents the useless radiation from reaching the detector 13 at the same time as the filter passes the part of the useful radiation which is polarized orthogonally to the emitted radiation. A favorable ratio between useful and useless signals is obtained in the detector (13).

In the above embodiment, the emitted radiation has been assumed to be linearly polarized with the electrical field vector orthogonal to the reference plane. Alternatively, the electrical field vector can be placed in the reference plane if, at the same time, the polarization filter is turned by 90°.

The invention is not limited to the embodiment shown in the above example but can be modified within the framework of the patent claims and concept of the invention following.

We claim:

1. Active proximity fuse for launchable units comprising:
    a transmitter for emitting electromagnetic radiation towards a target and a receiver for receiving the emitted electromagnetic radiation which is reflected towards the receiver;
    a reference plane being defined as a plane in which electromagnetic radiation emitted from the transmitter to the target is transmitted between the transmitter and receiver;
    the transmitter comprising means for linearly polarizing the emitted electromagnetic radiation in parallel with or orthogonally to the reference plane; and
    the receiver comprising means for suppressing electromagnetic radiation received by the receiver which has linear polarization essentially coinciding with the linear polarization direction of the emitted electromagnetic radiation, that is in parallel with or orthogonally to the reference plane, and which substantially corresponds to the emitted radiation reflected from particles in the atmosphere;
    a detector for detecting the electromagnetic radiation remaining after suppression which substantially corresponds to the radiation reflected by the target; and
    signal-comparing means for comparison of the level of the remaining electromagnetic radiation detected by said detector with a fixed reference level and for emitting an output signal when an output signal of said detector exceeds said fixed reference level.

2. Proximity fuse according to claim 1, wherein a laser diode with linear polarization is provided for producing the electromagnetic radiation emitted by the transmitter.

3. Proximity fuse according to claim 1, wherein a linear polarized NeNe laser is provided for producing the electromagnetic radiation emitted by the transmitter.

4. Proximity fuse according to claim 1, wherein said means in the receiver for suppressing electromagnetic radiation essentially coinciding with the linear direction of polarization of the emitted electromagnetic radiation consists of a polarization filter.

5. Proximity fuse according to claim 4, wherein the polarization filter consists of a dichroic polarizer.

6. Proximity fuse according to claim 4, wherein the polarization filter consists of a GLAN prism.

7. Proximity fuse according to claim 2, wherein said means in the receiver for suppressing electromagnetic radiation essentially coinciding with the linear direction of polarization of the emitted electromagnetic radiation consists of a polarization filter.

8. Proximity fuse according to claim 3, wherein said means in the receiver for suppressing electromagnetic radiation essentially coinciding with the linear direction of polarization of the emitted electromagnetic radiation consists of a polarization filter.

9. Active proximity fuse for launchable units comprising:
    a single transmitter for emitting electromagnetic radiation towards a target and a single receiver for receiving the emitted electromagnetic radiation which is reflected towards the receiver;
    a reference plane being defined as a plane in which electromagnetic radiation emitted from the transmitter to the target is transmitted between the transmitter and receiver;
    the transmitter comprising means for linearly polarizing the emitted electromagnetic radiation in parallel with or orthogonally to the reference plane; and
    the receiver comprising means for suppressing electromagnetic radiation received by the receiver which has linear polarization essentially coinciding with the linear polarization direction of the emitted electromagnetic radiation, and which is reflected by spherical particles in the atmosphere;
    a detector for detecting the electromagnetic radiation remaining after suppression; and
    signal-comparing means for comparison of the level of the remaining electromagnetic radiation detected by said detector with a fixed reference level and for emitting an output signal when an output signal of said detector exceeds said fixed reference level, whereby said means for suppressing prevents the electromagnetic radiation reflected by said particles from reading said detector and increases accuracy of said proximity fuse.

* * * * *